E. CLEMENT.
SHOCK ABSORBING WHEEL.
APPLICATION FILED JULY 21, 1914.
1,139,164. Patented May 11, 1915.
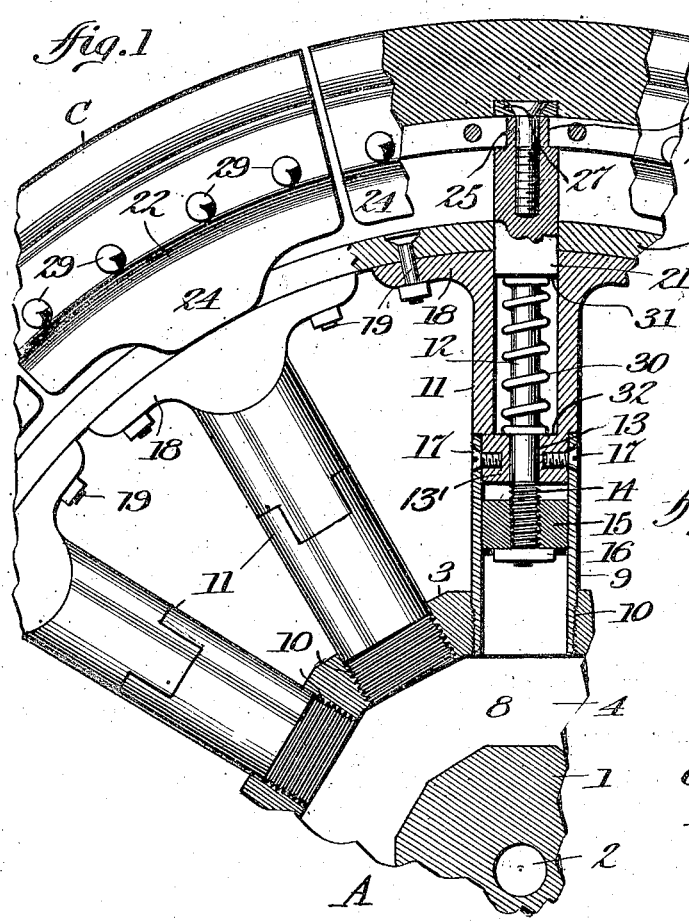
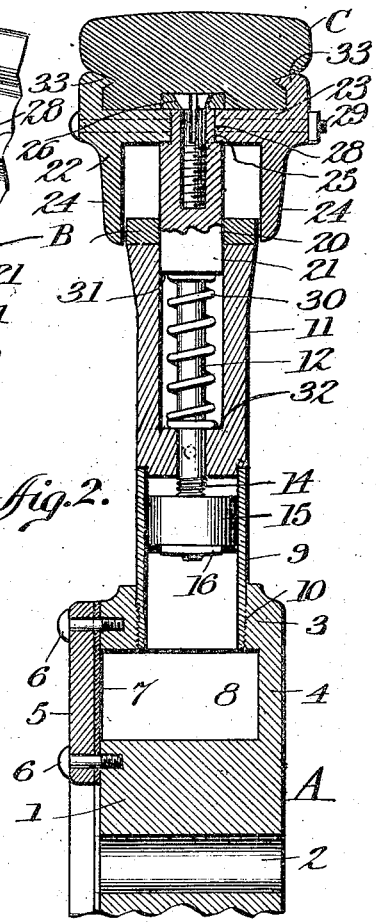
Inventor
Edward Clement
Witnesses
Philip E. Barnes
R. M. Smith
By Victor J. Evans
Attorney

UNITED STATES PATENT OFFICE.

EDWARD CLEMENT, OF MOBILE, ALABAMA, ASSIGNOR OF ONE-FOURTH TO W. H. CLEMENT AND ONE-FOURTH TO J. W. JERNIGAN, BOTH OF TROY, ALABAMA.

SHOCK-ABSORBING WHEEL.

1,139,164.      Specification of Letters Patent.      Patented May 11, 1915.

Application filed July 21, 1914. Serial No. 852,215.

*To all whom it may concern:*

Be it known that I, EDWARD CLEMENT, a citizen of the United States, residing at Mobile, in the county of Mobile and State of Alabama, have invented new and useful Improvements in Shock-Absorbing Wheels, of which the following is a specification.

This invention relates to shock absorbing wheels for vehicles the object in view being to produce a wheel in which the sections of a sectional tire are independently operable and all supported by a common air cushion contained within the hub of the wheel.

A further object of the invention is to provide in connection with such a wheel, novel means for fastening the sections of the tire to the cushioned supports therefor; also means for moving the tire sections outwardly after they have moved inwardly against the resistance of the cushioning means.

With the above and other objects in view, the invention consists in the novel construction, combination and arrangement of parts, as will be hereinafter more fully described, illustrated and claimed.

In the accompanying drawings:—Figure 1 is a side elevation partly in section of a portion of a vehicle wheel embodying the present invention. Fig. 2 is a diametrical cross section through the same. Fig. 3 is a detail perspective view of one of the tire clamps. Fig. 4 is a similar view of the outer end of one of the piston rods.

Referring to the drawings A generally designates the hub of the vehicle wheel, B the outer fixed rim, C the tire sections and clamps and D the spokes which connect the hub A and rim B.

In carrying out the present invention, the hub A is made relatively large and embodies a central core 1 formed with an axle opening 2, an outer wall 3, an integral side wall 4 and a detachable side wall 5 in the form of a cover plate which is fastened to the main body of the hub by means of screws or bolts 6 within which is a gasket 7 to insure an air-tight joint. The inner and outer walls of the hub are spaced apart relatively to each other so as to form between them and between the side walls 4 and 5 an annular or endless air cushion chamber 8 which is common to all of the air cylinders hereinafter referred to and contained within the spokes designated generally at D.

The inner end of each spoke comprises a tubular air cylinder 9 the inner end of which is threaded at 10 and screwed into the hub, the inner end of the cylinder 9 being open and in direct communication with the annular air cushion chamber 8.

The outer portion of each spoke consists of a tubular piston rod guide 11 and extending longitudinally through said guide 11 is a piston rod 12 the inner end portion of which passes through a constricted opening 13 in the otherwise closed inner end of the guide 11 which inner end forms a cylinder head 13'. The piston rod is threaded as shown at 14 and has an air compressing piston 15 screwed thereon and held fast by a lock nut 16. The cylinder 9 is rabbeted into the adjacent end of the guide 11 and fastened by means of screws 17 or their equivalent.

At its outer end each guide 11 is formed with oppositely extending attaching flanges 18 which are bolted or otherwise secured to the endless fixed rim B as shown at 19. The rim B is formed with guideways 20 through which the enlarged square outer plunger portions 21 of the piston rods 12 pass.

The tire is composed of a number of sections C corresponding with the number of air compressing pistons and piston rods and each tire section C is held by means of a pair of oppositely disposed clamps 22. Each clamp comprises an inwardly extending base portion 23 against which the inner face of the tire section C bears and is also provided with a side guard or fender flange 24 which lies in close proximity to or rides in contact with the adjacent edge of the fixed rim B. Each piston rod 12 is provided at its outer extremity with a projecting screw serving to secure a head or block 27 on the extreme end of said piston rod. The clamps 22 meet on opposite sides of the tenon 25 and are provided centrally on their meeting edges with recesses 28 which in complemental relation to each other correspond with the shape of the tenon 25. The opposite clamps 22 are firmly secured together by means of bolts 29 and when these bolts are tightened, the clamps 22 are held in fixed relation to each other and also in fixed relation to the tenon 25 and tread block C.

Each tire section is thus carried by the outer end of one of the piston rods and when a load is placed on any section of the tire, it yields inwardly, forcing the air compressing piston 15 in a corresponding direction until it is arrested by the cushioning effect of the air in the chamber 8 within the hub. As soon as said tire section is relieved of its load, it is returned to its outward position by means of the compressed air in chamber 8. The coiled expansion spring 30 which surrounds the piston rod 12 and is interposed between a shoulder 31 on the piston rod and another shoulder 32 within the guide 11 answers the purpose of throwing the piston rod 12 to its proper position after slipping on the rim B. The flanges 24 brace the tire clamps laterally, assisted by the plunger portions 21 of the piston rods and the clamps are braced longitudinally by the plunger portions 21 of the piston rods. The clamps 22 are shown as provided with tire section holding flanges 33 although any desired means may be employed for securing the tire sections C.

In the outward or return movement of each piston 15, an air cushion is formed between said piston and the cylinder head 13', the piston 15 being moved outwardly by the action of the respective spring 30. This prevents the tire sections from being thrust outwardly and stopped by contact with metallic shoulders which would produce a disagreeable noise and which would result in rapid deterioration of the wheel structure. The action of each spring 30 is, of course, assisted and supplemented by the air pressure against the inner face of the piston.

What I claim is:—

In a shock-absorbing wheel comprising a hub, a series of longitudinally movable tire supporting rods extending radially with respect to the center of the hub and non-circular in cross section, cushioning means for said rods, each of said rods having its outer extremity reduced to form a clamp engaging tenon non-circular in cross section, a pair of tire section holding clamps for each rod formed with notches which in complemental relation conform to the shape of said tenon and snugly receive the same, and means for securing said pair of clamps in fixed relation to one another and said tenon.

In testimony whereof I affix my signature in presence of two witnesses.

EDWARD CLEMENT.

Witnesses:
J. W. JERNIGAN.
J. D. ANDERSON.

Copies of this patent may be obtained for five cents each, by addressing the "Commissioner of Patents, Washington, D. C."